United States Patent Office 2,708,737
Patented May 17, 1955

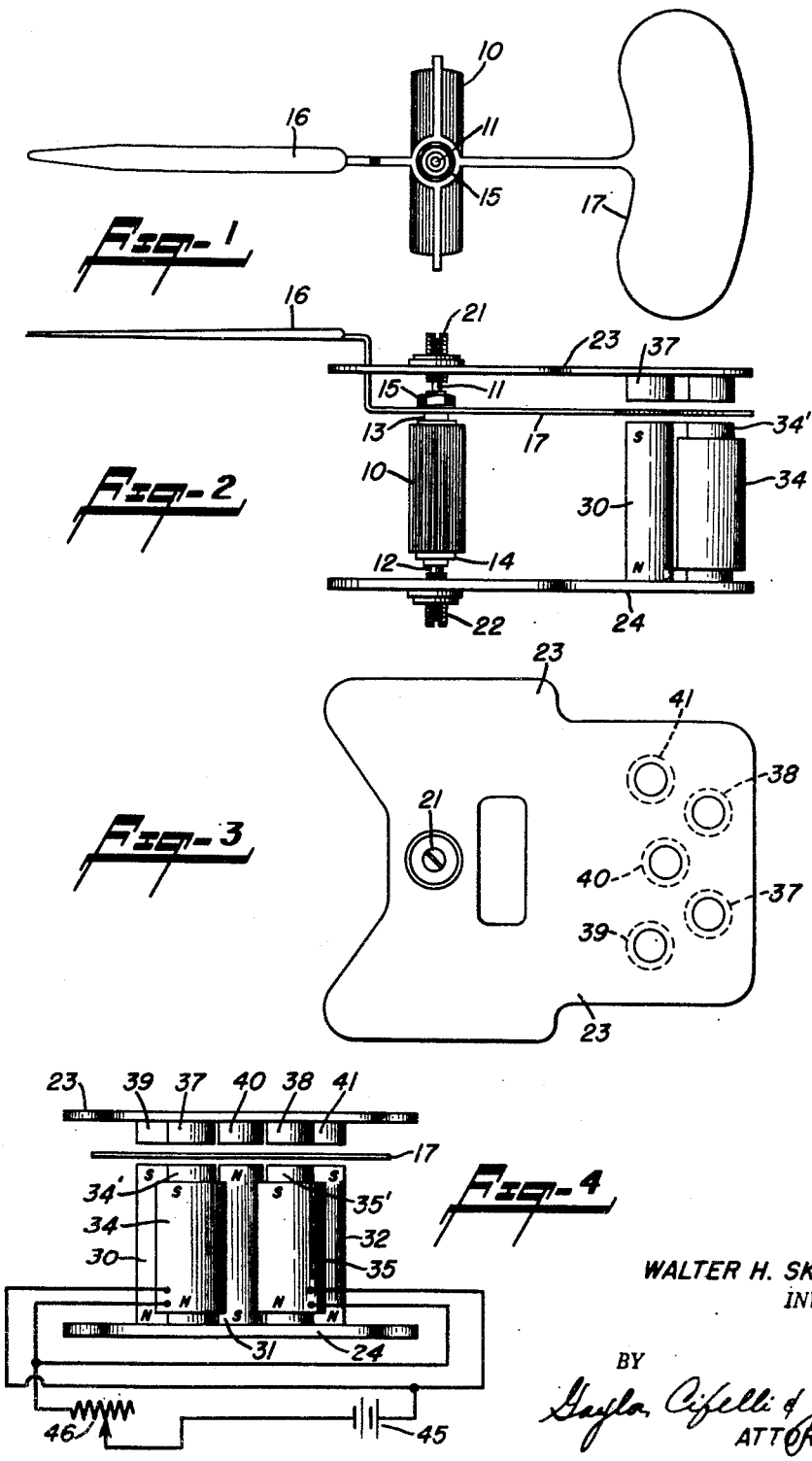

2,708,737

INSTRUMENT DAMPING SYSTEM

Walter H. Skidmore, Rutherford, N. J., assignor to Weston Electrical Instrument Corporation, Newark, N. J., a corporation of New Jersey Application June 18, 1952, Serial No. 294,287

2 Claims. (Cl. 324—125)

This invention relates to damping devices for electrical instruments and more particularly to a novel damping device affording selective control of the damping effect upon the instrument movable mechanism.

Damping devices are used to advantage on electrical indicating instruments to facilitate the reading of the pointer position relative to an associated scale. In general, the movable mechanism of the instrument, having significant inertia, normally oscillates about the final steady-state position thereby making a reading of the instrument indication difficult in those instances where the deflection force applied to the mechanism varies over a range of discreet values in fairly rapid sequence. In the case of a direct current indicating instrument the damping problem has been solved by winding the movable coil upon a closed, metallic frame having a relatively low electrical resistance. In alternating current instruments, such as the movable iron, induction and electro-dynamometer types, the problem of providing sufficient damping of the movable mechanism is somewhat more complicated especially when such factors as minimum overall instrument size, and selective adjustability of the damping factor, are taken into consideration.

An object of this invention is the provision of a magnetic damping device for an electrical instrument and including selectively-operable means external of the instrument effective to alter the damping influence of the device on the instrument movable mechanism.

An object of this invention is the provision of a damping device for an electrical instrument said device being of the permanent magnet and electro-magnet type whereby various degrees of damping or over-damping of the movable mechanism may be obtained.

An object of this invention is the provision of a damping device for an electrical mechanism having a movable vane, said device comprising a pair of spaced, magnetic material plates, alined permanent magnets carried by one of the plates and having polar surfaces spaced a relatively small distance from the vane, and electro-magnets carried by one of the plates, said electro-magnets including a magnetic material core having one end in contact with the supporting plate and the other end spaced from the said vane.

These and other objects and advantages will become apparent from the following description when taken with the accompanying drawings in which:

Figure 1 is a top plan view of an instrument movable mechanism comprising a pivotally-mounted coil carrying a pointer and damping vane;

Figure 2 is a side elevation of the mechanism shown in Figure 1 pivotally secured in position by two spaced plates that carry the damping magnets;

Figure 3 is a top, plan view of the upper plate showing the soft-iron cylindrical discs employed to concentrate the magnetic flux lines cutting the damper vane; and Figure 4 is a rear elevation view of the assembly shown in Figure 2.

In Figures 1 and 2 of the drawings, the numeral 10 identifies a wire-wound, movable coil adapted for rotation about an axis defined by a pair of oppositely-disposed pivots 11, 12, that are secured to the coil by means of conventional pivot bases 13, 14, respectively. Secured to the coil, as by the nut 15, are the pointer 16, and damping vane 17, the latter being made of thin, sheet metal having a desired thickness and electrical resistivity. The pivots of the movable coil are individually positioned by conventional jewels carried by the jewel screws 21, 22, that are supported in the spaced plates 23, 24, respectively. Those skilled in this art will understand that the plates 23, 24, are secured in fixed, spaced position by suitable posts and that the movable coil 10 rotates in a magnetic flux field established by a suitable source of magnetic energy that likewise is secured in fixed position relative to the coil, whereby the pointer assumes an angular position, relative to a suitable scale, depending on the reaction between the maknetic field flux and the flux resulting from current flowing through the movable coil. Normally, the current is led to the movable coil by means of spiral springs which also provide a counter-torque tending to return the pointer to a fixed position relative to the associated scale; such springs, being well known in the art, are not shown in the drawings. In the case of an electro-dynamometer instrument, the magnetic field is provided by a field coil carried by a suitable laminated yoke, the spaced plates 23, 24, being secured to the yoke by suitable studs.

The spaced plates 23, 24, are made of magnetic material, such as soft-iron. As shown in Figures 2 and 4, the lower plate 24 carries three bar magnets 30, 31, and 32 (having upper, polar surfaces spaced a relatively small distance from the vane 17) and the two electromagnets 34, 35, the latter comprising coils carried by the soft-iron cores 34', 35', respectively. The bar magnets may be provided with reduced-diameter, lower ends that are force-fitted into suitable holes provided in the plate 24. The soft-iron cores may have ends similarly formed but being made of malleable material the core ends may extend through the holes in the plate and be peaned over to secure the cores in firm, upright position. The upper plate 23 has secured thereto a plurality of soft-iron discs 37—41, each alined with one of the bar magnets and cores carried by the lower plate. As shown in Figure 3, the discs 37—41 have reduced-diameter ends extending through holes in the upper plate and such ends being peaned over slightly to secure the parts in place, but any other suitable arrangement may be used to secure the discs to the plate.

It will be noted that the outer bar magnets 30, 32, are oriented so that the S magnetic pole is adjacent to the vane 17, whereas the inner magnet 31 is of reversed polarity. The magnetic flux lines, therefore, emanate from the N pole of the bar magnet 31, pass through the vane to the alined soft-iron disc 40, through the upper plate 23 and the soft-iron discs 39 and 41, to the S poles of the bar magnets 30, 32, and through the lower plate 24 to the S pole of the bar magnet 31. Thus, it is apparent that the permanent magnet bars are arranged in series relationship thereby providing a strong magnetic flux field across the air gaps and through the vane. The conducting vane 17 moves through such magnetic flux field whereby eddy currents are induced in the vane, the magnitudes of such currents depending on the strength of the flux field and the velocity of movement of the vane. The magnetic reaction between the magnetic flux field cut by the vane and that resulting from the eddy currents is such that it opposes movement of the vane thereby providing a damping action.

The damping effect provided by the permanent magnet bars 30, 31, 32, depends upon the strength of the individual bar magnets, the number of such magnets and the relative disposition of their polar ends. I prefer to adjust the overall damping effect of the permanent magnets so as to achieve a maximum level of damping that is slightly below the required damping factor of the particular mechanism. Such initial damping effect is augmented by the electro-magnetic damping provided by the electro-magnets 34, 35, which are energized from a suitable D.-C. source such as the battery 45 shown in Figure 4. Here the electro-magnets are shown connected in parallel and the strength of the magnetic flux field established at the ends of the cores 34', 35', may be controlled by a rheostat 46 connected between the electro-magnets and the battery. Obviously, the electro-magnets may be connected in series. Thus, it is possible to control the overall damping effect of the instrument smoothly, conveniently and accurately from the base level provided by the permanent magnet bars to a higher level that includes the permanent magnet and electro-magnetic effects. It is also possible to provide a wider latitude of damping adjustment by reversing the direction of the electro-magnetic flux so that it opposes the permanent magnet flux, whereby the damping characteristics of the mechanism may have a controlled range from some desired minimum level to a maximum level.

Having now described my invention it is apparent that I provide a combined permanent magnet and electro-magnetic damping effect whereby the actual damping rate of a movable mechanism may be controlled as required in a particular instrument.

I claim:

1. A magnetic damping device for cooperation with a damping vane carried by an instrument movement, said device comprising a pair of spaced plates made of magnetic material, alined bearing members carried by the plates and supporting the movement for rotation therebetween, a plurality of laterally-spaced cylindrical permanent magnets each having an end secured to one of the plates and an end spaced a relatively small distance from the vane, a plurality of cylindrical magnetic material cores each having an end secured to one of the plates and an end spaced a relatively small distance from the vane, electrical coils carried by the cores, a D.-C. potential source, and an adjustable resistor connected between each of said coils and the source.

2. The invention as recited in claim 1 including a plurality of magnetic material discs carried by the other plate, said discs having ends spaced from the vane and alined with the free ends of said permanent magnet bars and cores.

References Cited in the file of this patent
UNITED STATES PATENTS

| | | |
|---|---|---|
| 1,637,049 | Pratt | July 16, 1927 |
| 2,353,617 | Lamb | July 11, 1944 |